United States Patent
Sudo

(10) Patent No.: US 10,545,335 B2
(45) Date of Patent: Jan. 28, 2020

(54) OPTICAL SYSTEM, AND IMAGE PICKUP APPARATUS AND IMAGE PICKUP SYSTEM INCLUDING THE SAME

(71) Applicant: CANON KABUSHIKI KAISHA, Tokyo (JP)

(72) Inventor: Kenta Sudo, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 15/954,025

(22) Filed: Apr. 16, 2018

(65) Prior Publication Data
US 2018/0299669 A1 Oct. 18, 2018

(30) Foreign Application Priority Data
Apr. 17, 2017 (JP) .................. 2017-081258

(51) Int. Cl.
| | |
|---|---|
| *G02B 27/00* | (2006.01) |
| *G02B 9/60* | (2006.01) |
| *G02B 15/14* | (2006.01) |
| *G02B 5/18* | (2006.01) |

(52) U.S. Cl.
CPC .......... *G02B 27/0037* (2013.01); *G02B 9/60* (2013.01); *G02B 15/14* (2013.01); *G02B 5/1814* (2013.01)

(58) Field of Classification Search
CPC ...... G02B 27/0037; G02B 9/60; G02B 15/14; G02B 5/1814

USPC ........................................... 359/694
See application file for complete search history.

(56) References Cited

U.S. PATENT DOCUMENTS

| | | | |
|---|---|---|---|
| 2010/0182697 A1* | 7/2010 | Suzuki ............... | G02B 25/001 359/558 |
| 2016/0363759 A1 | 12/2016 | Sudo | |
| 2018/0100994 A1 | 4/2018 | Sudo et al. | |

FOREIGN PATENT DOCUMENTS

| | | |
|---|---|---|
| JP | 2003-287678 A | 10/2003 |
| JP | 2015-41019 A | 3/2015 |

* cited by examiner

*Primary Examiner* — Evan P Dzierzynski
*Assistant Examiner* — Mitchell T Oestreich
(74) *Attorney, Agent, or Firm* — Carter, DeLuca & Farrell LLP

(57) ABSTRACT

Provided is an optical system comprising a cemented lens including a positive lens, a negative lens, and an optical element cemented to the positive lens and the negative lens in which the optical element is made of an ultraviolet curing resin. An internal transmittance at a wavelength of an ultraviolet ray at which the ultraviolet curing resin is cured per thickness of 10 mm of a material for a first lens which is arranged on an object side out of the positive lens and the negative lens, and a minimum value and a maximum value of a thickness of the first lens in an optical axis direction are appropriately set.

15 Claims, 9 Drawing Sheets

OPTICAL SYSTEM, AND IMAGE PICKUP APPARATUS AND IMAGE PICKUP SYSTEM INCLUDING THE SAME

BACKGROUND OF THE INVENTION

Field of the Invention

The present invention relates to an optical system and an image pickup apparatus including the optical system, which are suitable for an image pickup optical system, such as a digital camera, a video camera, a broadcasting camera, a monitoring camera, or a silver-halide film camera.

Description of the Related Art

An optical system used in an image pickup apparatus has been required to have a small total lens length, a small size as a whole, and high optical performance. For example, when the optical system is a zoom lens, the zoom lens is required to have high optical performance over the entire zoom range. In order to keep the optical performance of the optical system satisfactory, it is particularly important to correct chromatic aberration among various aberrations. It has hitherto been known that high optical performance is obtained with use of an optical element in an optical path of the optical system. In this case, the optical element is, for example, a diffraction surface, a replica aspherical surface, or a solid material having an abnormal partial dispersion characteristic.

There is known a zoom lens in which the occurrence of the chromatic aberration, such as axial chromatic aberration or lateral chromatic aberration, is reduced with use of, for example, the diffraction surface as the optical element (Japanese Patent Application Laid-Open No. 2015-41019 and Japanese Patent Application Laid-Open No. 2003-287678). In each of Japanese Patent Application Laid-Open No. 2015-41019 and Japanese Patent Application Laid-Open No. 2003-287678, there is disclosed a zoom lens including, in order from an object side to an image side, a first lens unit to a fourth lens unit having positive, negative, negative, and positive refractive powers, and using a diffractive optical element for the first lens unit.

The use of the optical element for the optical system facilitates obtaining high optical performance. The use of an ultraviolet (UV) curing resin to form the optical element facilitates manufacture of the optical element and further facilitates obtaining predetermined optical performance.

The use of, for example, a diffractive optical element having a diffraction surface as the optical element for a part of the optical system facilitates correcting the chromatic aberration and obtaining high optical performance. In each of many UV curing resins for use in optical elements, there is a difference between a wavelength at which the UV curing resin is cured by UV irradiation (hereinafter referred to as "curing wavelength") and a wavelength at which the UV curing resin is deteriorated by the UV irradiation (hereinafter referred to as "deteriorating wavelength"). For this reason, when the UV curing resin is irradiated with much light having the deteriorating wavelength, the UV curing resin is deteriorated to cause a change in optical performance of the optical element molded with use of the UV curing resin. It is thus difficult to obtain high optical performance even by using the optical element.

That is, it is difficult to effectively reduce the chromatic aberration even by using, for example, the diffraction surface made of the UV curing resin as the optical element. Therefore, at the time of arranging in the optical path the diffractive optical element having the diffraction surface molded with use of the UV curing resin, it is important to appropriately set a lens provided with the diffraction surface and the position of the diffraction surface in the optical path, and the like.

SUMMARY OF THE INVENTION

It is an object of the present invention to provide an optical system, which is excellent in resistance to environment and moldability and is capable of easily obtaining satisfactory optical performance when an optical element made of a UV curing resin is used in a part of an optical path.

The optical system according to the present invention comprises a cemented lens including a positive lens, a negative lens, and an optical element cemented to the positive lens and the negative lens, in which the optical element is made of an ultraviolet curing resin, and the following conditional expressions are satisfied:

$$0.60 < |\tau i^{(t/10)}| < 0.95; \text{ and}$$

$$0.50 < |\tau i^{(T/10)}| < 0.95,$$

where $\lambda i$ represents a wavelength of an ultraviolet ray at which the ultraviolet curing resin is cured, $\tau i$ represents an internal transmittance at the wavelength $\lambda i$ per thickness of 10 mm of a material for a first lens, which is arranged on an object side out of the positive lens and the negative lens, and t and T represent a minimum value and a maximum value of a thickness of the first lens in an optical axis direction, respectively.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Next, an optical system and an image pickup apparatus including the optical system according to an embodiment of the present invention are described. The optical system according to this embodiment includes at least one cemented lens, which is formed by cementing one positive lens and one negative lens, and includes an optical element using a UV curing resin on the cemented surface.

It is an object of this embodiment to obtain an optical system including an optical element having satisfactory moldability and resistance to environment and capable of easily obtaining high optical performance, and an image pickup apparatus including the optical system. Thus, in each Example, a material for the optical element, for example, a lens, the configuration of the optical element, and the like are set appropriately.

The optical element in this embodiment is made of a UV curing resin. The UV curing resin is formed of a monomer, an oligomer, a photoinitiator, and some other additives, and has a characteristic of being cured when irradiated with UV rays. The UV curing resin has this characteristic because the photoinitiator is excited due to the irradiation and the monomer polymerizes to be converted to a polymer.

The optical element in this embodiment is molded by dropping the UV curing resin onto a lens surface having a lens curvature and performing UV irradiation from the lens side to cure the UV curing resin. Therefore, appropriate UV irradiation is required to be performed on a lens having such a shape that the thicknesses in the optical axis direction on the optical axis and at the outermost diameter portion are different from each other.

Figure 8:
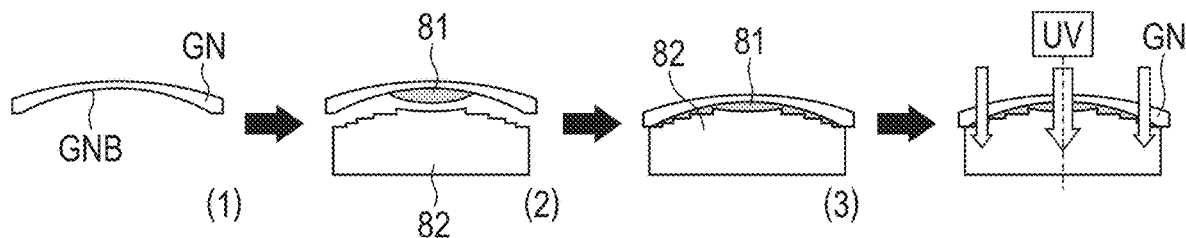
FIG. 8 is an explanatory view of a molding process for an optical element.

FIG. 8 is an explanatory view of a molding process at the time of molding an optical element (diffraction surface) on a concave surface GNB of a negative lens GN with use of a UV curing resin 81. In Step (1) of FIG. 8, the UV curing resin 81 in an uncured state is dropped onto the lens GN, which serves as a substrate. In Step (2), the space between the lens GN and a molding mold 82 is filled with the resin to transfer the mold shape onto the lens surface. Subsequently, in Step (3), the UV curing resin is irradiated with UV rays UV from a UV light source to be cured from the lens GN side.

At this time, as a material for the lens GN, which serves as the substrate of the optical element, it is required to select a material that allows passage of UV rays having a wavelength (curing wavelength) at which the UV curing resin is cured. In this regard, it is also required to consider a wavelength (deteriorating wavelength) at which the resin is deteriorated due to UV rays in order for the optical element to have the resistance to environment.

Figure 9:
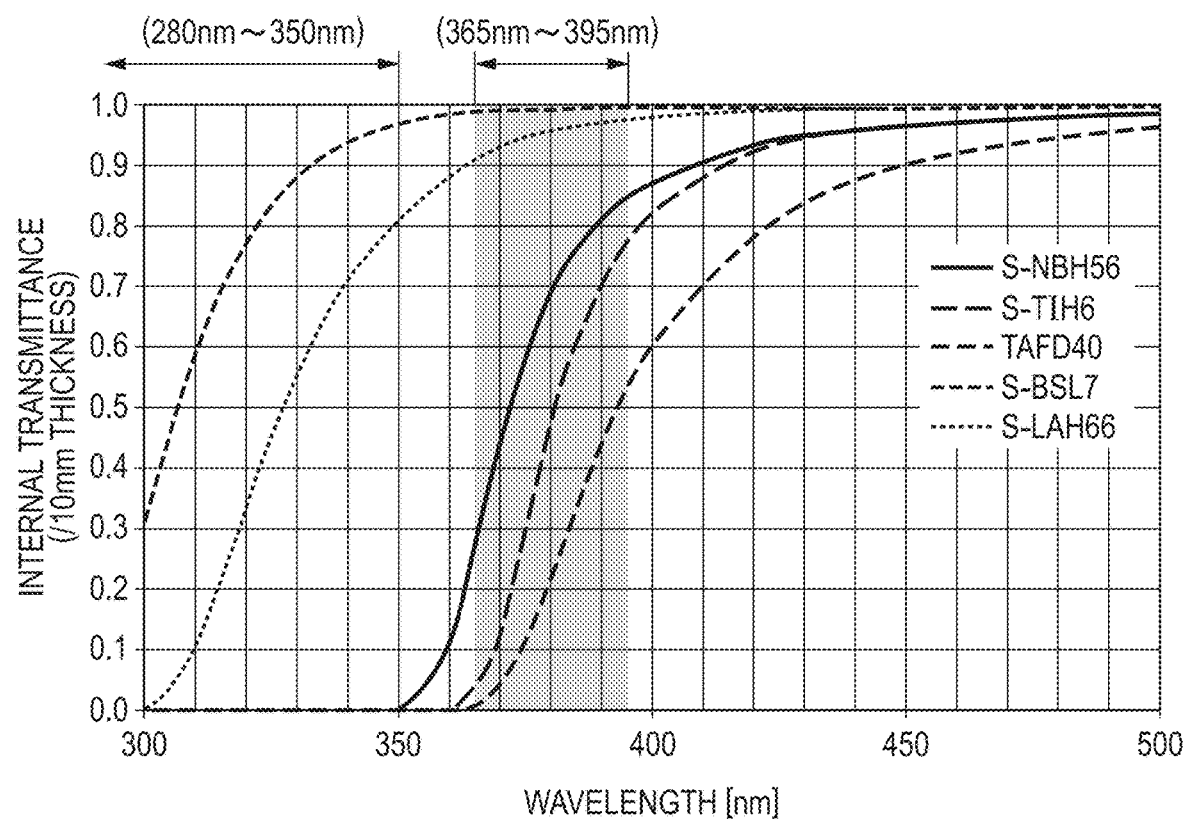
FIG. 9 is an explanatory graph of a relationship between an internal transmittance of a glass material and a wavelength.

FIG. 9 is an explanatory graph for showing a relationship between an internal transmittance of each of several typical glass materials (materials), which are used in configuration of the optical system, and a wavelength exhibited when the thickness of the glass material is 10 mm. As for the internal transmittance of each glass material with respect to the wavelength, a numerical value in a sample having a thickness of 10 mm has been published in a glass catalog of each glass material manufacturer (e.g., OHARA INC.).

In general, a wavelength of UV rays with which irradiation is performed at the time of curing resin is selected from a wavelength band of from 365 nm to 395 nm. Further, in acrylic, epoxy, and the like, which are typical resin materials used for the optical element, a molecule is formed by a carbon-carbon bond. The chemical bond of this carbon-carbon bond is easily disconnected by light in a wavelength band of from 280 nm to 350 nm.

In this embodiment, as the curing wavelength ($\lambda i$) of the UV rays at which the UV curing resin is cured, UV rays having a wavelength of 370 nm are used. Further, as a wavelength (deteriorating wavelength) ($\lambda det$) of the UV rays at which the UV curing resin is deteriorated, UV rays having a wavelength of 350 nm are used. For example, a glass material having a high transmittance in the wavelength band of from 365 nm to 395 nm, such as S-BSL7 (product name) (manufactured by OHARA INC.) or S-LAH66 (product name) (manufactured by OHARA INC.), has a high transmittance also in a wavelength band of 350 nm or less. Therefore, the deterioration of the optical element due to the UV rays is concerned.

Meanwhile, a glass material having a relatively high refractive index, such as S-TIH6 (product name) (manufactured by OHARA INC.) or TAFD40 (product name) (manufactured by HOYA Corporation), has a component having absorption from a visible short-wavelength range to a UV range. Therefore, the transmittance in the wavelength band of 350 nm or less is almost zero or very low, and the transmittance in the wavelength band of from 365 nm to 395 nm also tends to be low. When the optical element is to be molded by causing UV rays to pass through those glass materials, the internal transmittance of the UV rays for curing the resin is too low to cure the resin, depending on the thickness of the glass material.

Figure 10:
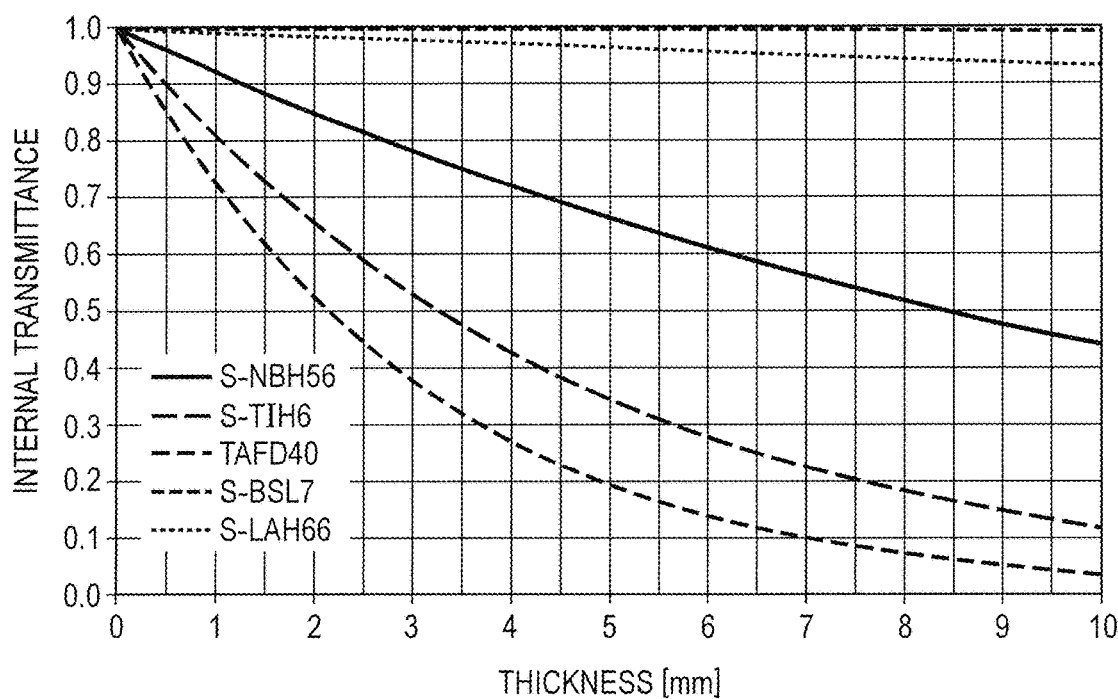
FIG. 10 is an explanatory graph of the relationship between the internal transmittance of the glass material and its thickness.

FIG. 10 is an explanatory graph of a relationship between the thickness of each of several typical glass materials and the internal transmittance at a wavelength of 370 nm. As shown in FIG. 10, in general, the transmittance decreases as the thickness of the glass increases. As in the meniscus negative lens GN illustrated in FIG. 8, when there is a difference between the thickness of the lens on the optical axis and the thickness at the outermost diameter portion, the transmittance at the outermost diameter portion is lower than that on the optical axis.

For the above-mentioned reason, when the UV irradiation is performed in this embodiment, the thickness of the lens is considered in addition to the glass material for the lens having the surface of the optical element.

Further, in the cemented lens used for the optical system of this embodiment, the optical element is formed on the cemented surface between the negative lens and the positive lens. This configuration is adopted in order to increase the durability of the optical element in an environment in which the optical element is exposed to direct sunlight or rain and wind, for example, the outside environment, by sandwiching the front and rear (light incident and emitting surfaces) of the optical element between the lenses. Further, through formation of the optical element on the cemented surface of the negative lens and the positive lens, the effect of correcting the chromatic aberration is also obtained effectively. In this embodiment, conditions given below are added so as to effectively satisfy the object of the present invention.

A wavelength of UV rays at which the UV curing resin is cured by irradiation is represented by $\lambda i$. An internal transmittance at the wavelength $\lambda i$ per thickness of 10 mm of a material for a lens 1 on the light incident side, which forms the cemented lens, is represented by $\tau i$. The minimum value and the maximum value of the thickness of the lens 1 in a direction parallel to the optical axis are represented by t and T, respectively. At this time, the following conditional expressions are satisfied.

$$0.60 < |\tau i^{(t/10)}| < 0.95 \quad (1)$$

$$0.50 < |\tau i^{(T/10)}| < 0.95 \quad (2)$$

Conditional Expression (1) and Conditional Expression (2) define the transmittance at the wavelength λi in the lens 1, which is located closer to an object than the optical element of the cemented lens having the optical element on the cemented surface, out of the cemented lenses included in the optical system. As for Conditional Expression (1) and Conditional Expression (2), a transmittance at a height at which the lens 1 has the smallest thickness in the direction parallel to the optical axis is defined by Conditional Expression (1), and a transmittance at a height at which the lens 1 has the largest thickness in the direction is defined by Conditional Expression (2).

When the transmittance exceeds the upper limit value of Conditional Expression (1) or Conditional Expression (2), the transmittance of the UV rays at the wavelength λi becomes excessively higher, and hence energy required for curing the resin becomes sufficient, but the transmittance of the UV rays that deteriorate the resin also increases at the same time. For this reason, the optical element is deteriorated. When the transmittance falls below the lower limit value of Conditional Expression (1) or Conditional Expression (2), the transmittance of the UV rays is excessively low, and hence the irradiation energy required for curing the UV curing resin becomes insufficient to make the molding of the optical element difficult, which is not preferred.

It is preferred to limit the numerical value ranges of Conditional Expression (1) and Conditional Expression (2) as follows.

$$0.60 < |\tau i^{(t/10)}| < 0.90 \quad (1a)$$

$$0.55 < |\tau i^{(T/10)}| < 0.85 \quad (2a)$$

The optical system being the object of the present invention is obtained by being configured as described above, and it is further preferred to satisfy at least one of the following conditional expressions. A wavelength of UV rays at which the UV curing resin is deteriorated by irradiation is represented by λdet, and an internal transmittance at the wavelength λdet per thickness of 10 mm of the material for the lens 1 is represented by τdet. A thickness of the lens 1 on the optical axis is represented by "d". A curvature radius of the object-side lens surface of the lens 1 is represented by r1, and a curvature radius of the image-side lens surface of the lens 1 is represented by r2. A partial dispersion ratio and an Abbe number of the material for the lens 1 are represented by θgF and νd, respectively. At this time, it is preferred to satisfy at least one of the following conditional expressions.

$$0.00 \leq |\tau det^{(t/10)}| < 0.15 \quad (3)$$

$$0.10 < d/T < 1.00 \quad (4)$$

$$-7.00 < (r2+r1)/(r2-r1) < -0.50 \quad (5)$$

$$0.001 < |\theta gF - 0.6438 + 0.001682 \times \nu d| < 0.020 \quad (6)$$

Each of optical materials used in each Example has the following Abbe number νd and partial dispersion ratio θgF. Refractive indices with respect to the Fraunhofer lines of the g-line (435.8 nm), the F-line (486.1 nm), the d-line (587.6 nm), and the C-line (656.3 nm) are represented by Ng, NF, Nd, and NC, respectively. The Abbe number νd and the partial dispersion ratio θgF with respect to the g-line and the F-line are expressed as the following expressions.

$$\nu d = (Nd-1)/(NF-NC)$$

$$\theta gF = (Ng-NF)/(NF-NC)$$

Next, the technical meanings of the above-mentioned conditional expressions are described.

Conditional Expression (3) defines the transmittance at the wavelength λdet in the lens 1, which is located closer to the object than the optical element of the cemented lens having the optical element on the cemented surface, out of the cemented lenses included in the optical system. When the transmittance exceeds the upper limit value of Conditional Expression (3), the transmittance of the UV rays having the wavelength λdet becomes excessively higher, and hence the optical element is deteriorated. It is further preferred to limit the numerical value being the upper limit value of Conditional Expression (3) as follows.

$$0.00 \leq |\tau det^{(t/10)}| < 0.10 \quad (3a)$$

Conditional Expression (4) defines a ratio of the thickness d on the optical axis to the maximum thickness T in the direction parallel to the optical axis in the lens 1, which is located closer to the object than the optical element of the cemented lens having the optical element on the cemented surface, out of the cemented lenses included in the optical system. When the ratio exceeds the upper limit value of Conditional Expression (4), and the thickness of the lens 1 on the optical axis thus becomes excessively larger, the entire system increases in size, which is not preferred.

When the ratio falls below the lower limit value of Conditional Expression (4), and the thickness of the lens on its periphery thus becomes excessively larger, the transmittance of the UV rays on the periphery becomes lower than that on the optical axis. This makes the molding at the outermost diameter portion of the optical element difficult, which is not preferred. It is further preferred to limit Conditional Expression (4) as follows.

$$0.20 < d/T < 0.70 \quad (4a)$$

Conditional Expression (5) defines a shape factor (lens shape) of the lens 1. When the ratio falls below the lower limit value of Conditional Expression (5), a difference in curvature between the lens surface on the object side and the lens surface on the image side becomes smaller, and the refractive power of the lens 1 decreases. Thus, it becomes difficult to correct the axial chromatic aberration.

When the ratio exceeds the upper limit value of Conditional Expression (5), a difference in curvature between the lens surface on the object side and the lens surface on the image side becomes larger, and the refractive power of the lens 1 becomes excessively larger, with the result that variations in field curvature and lateral chromatic aberration increase at the telephoto end. It is further preferred to limit Conditional Expression (5) as follows.

$$-6.00 < (r2+r1)/(r2-r1) < -1.00 \quad (5a)$$

Conditional Expression (6) defines an anomalous dispersion of the material for the lens 1. When the value exceeds the upper limit value of Conditional Expression (6), and the anomalous dispersion thus becomes excessively larger, the refractive power on the short wavelength side becomes excessively higher, and thus it becomes difficult to correct the lateral chromatic aberration. When the value falls below the lower limit value of Conditional Expression (6), and the anomalous dispersion thus becomes excessively smaller, it becomes difficult to correct the lateral chromatic aberration at the telephoto end. It is further preferred to limit the numerical value range of Conditional Expression (6) as follows.

$$0.002<|\theta gF-0.6438+0.001682\times vd|<0.018 \quad (6a)$$

It is more preferred to set the numerical value ranges of Conditional Expressions (1a) to (6a) as follows.

$$0.70<|\tau i^{(t/10)}|<0.90 \quad (1b)$$

$$0.60<|\tau i^{(t/10)}|<0.75 \quad (2b)$$

$$0.00\leq|\tau det^{(t/10)}|<0.01 \quad (3b)$$

$$0.30<d/T<0.60 \quad (4b)$$

$$-5.00<(r2+r1)/(r2-r1)<-1.50 \quad (5b)$$

$$0.003<|\theta gF-0.6438+0.001682\times vd|<0.016 \quad (6b)$$

It is further preferred that the optical system according to this embodiment be configured as follows. Specifically, it is preferred that the optical system be formed of a zoom lens including a plurality of lens units, in which an interval between each pair of adjacent lens units is changed during zooming, and the optical element be arranged in the lens unit arranged closest to the object. With this configuration, it is possible to satisfactorily correct spherical aberration, coma, and the like that occur from each lens unit, and to satisfactorily correct the axial chromatic aberration particularly at the telephoto end.

It is preferred that the lens 1 be arranged closest to the object among the lenses included in the optical system. This lens 1 enables the optical element to be held resistant to environment and to be arranged on the lens surface closer to the object, and hence the axial chromatic aberration can be satisfactorily corrected at the telephoto end.

It is preferred that the optical system according to this embodiment be a zoom lens including, in order from the object side to the image side, a first lens unit to a fifth lens unit having positive, negative, positive, negative, and positive powers, in which an interval between each pair of adjacent lens units is changed during zooming. When such a zoom type is adopted, it becomes easier to satisfactorily correct variations in aberration during zooming to enable high optical performance to be obtained in the entire zoom region. When the diffraction surface is used to form the optical element in each Example, it is possible to satisfactory correct chromatic aberration in light from visual light to near-infrared light.

The image pickup apparatus according to this embodiment includes a solid-state image pickup element configured to receive light of an image formed by the optical system. In recent years, a charge coupled device (CCD) sensor and a complementary metal oxide semiconductor (CMOS) sensor have been mainly used to digitally process an image. The image pickup apparatus according to this embodiment is also an image pickup apparatus including a solid-state image pickup element corresponding to the above. The image pickup apparatus may also be configured to have a dome mounted thereto when used as a monitoring camera, for example.

Figure 1:
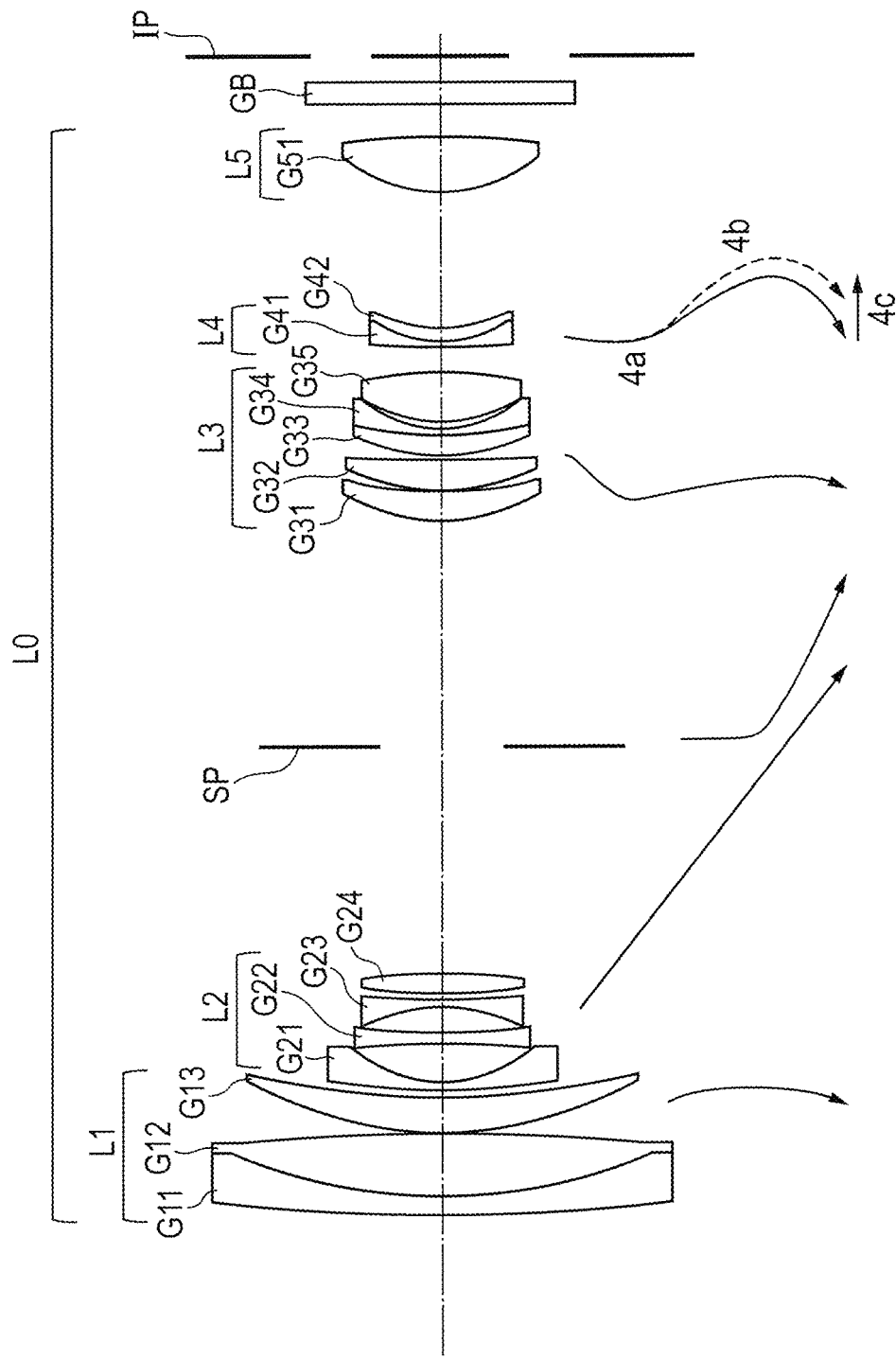
FIG. 1 is a lens cross-sectional view of an optical system of Example 1 of the present invention at a wide angle end when focusing at infinity.
Figure 2:
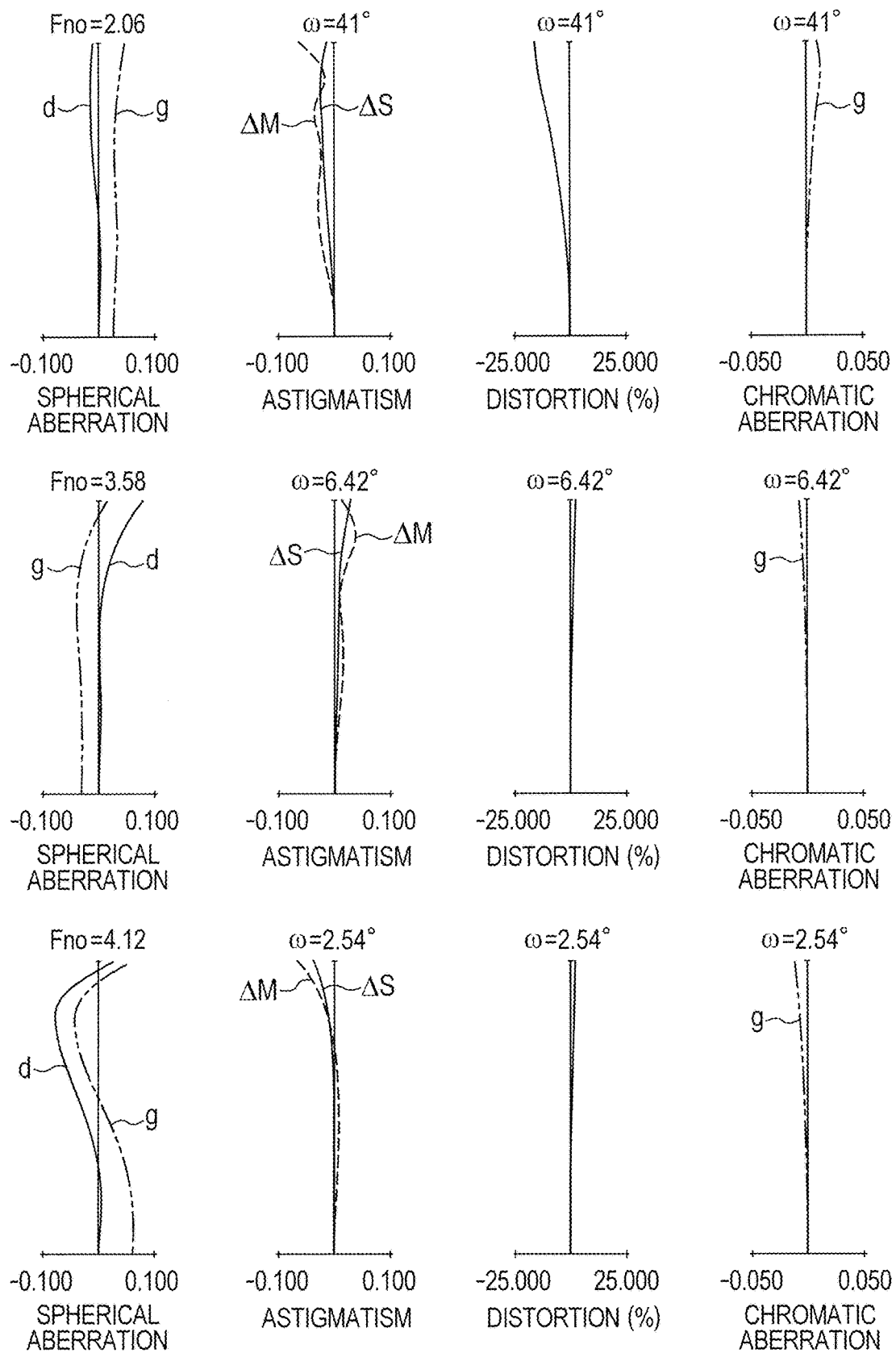
FIG. 2 is aberration diagrams of the optical system of Example 1 at the wide angle end, at an intermediate zoom position, and at a telephoto end when focusing at infinity.

Each Example is now described in which the optical system according to this embodiment is formed of a zoom lens. FIG. 1 is a lens cross-sectional view of a zoom lens of Example 1 of the present invention at a wide angle end (short focal length end) when focusing on an object at infinity. FIG. 2 is longitudinal aberration diagrams of the zoom lens of Example 1 at the wide angle end, at an intermediate zoom position, and at a telephoto end (long focal length end) in order from the top when focusing on an object at infinity.

Figure 3:
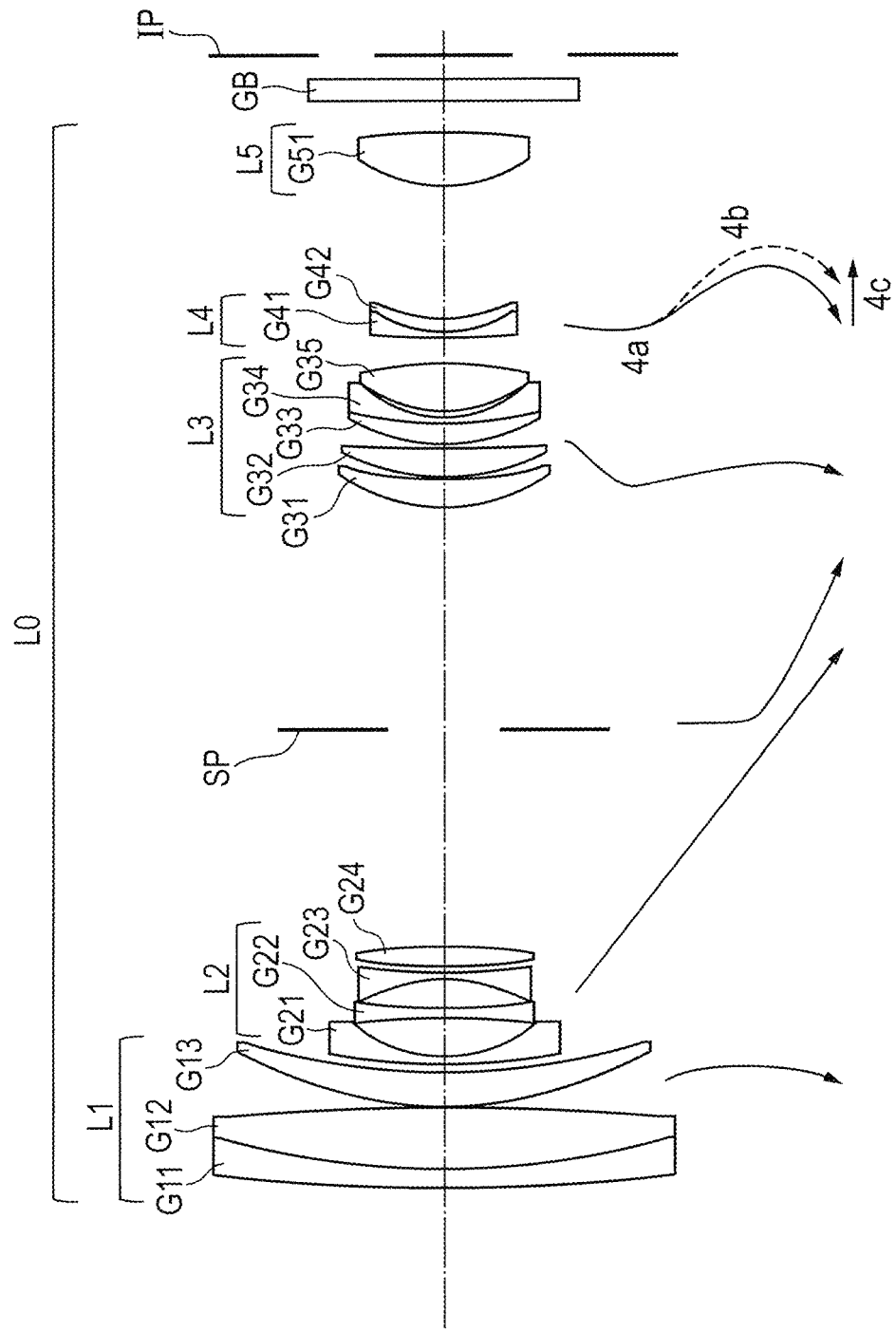
FIG. 3 is a lens cross-sectional view of an optical system of Example 2 of the present invention at a wide angle end when focusing at infinity.
Figure 4:
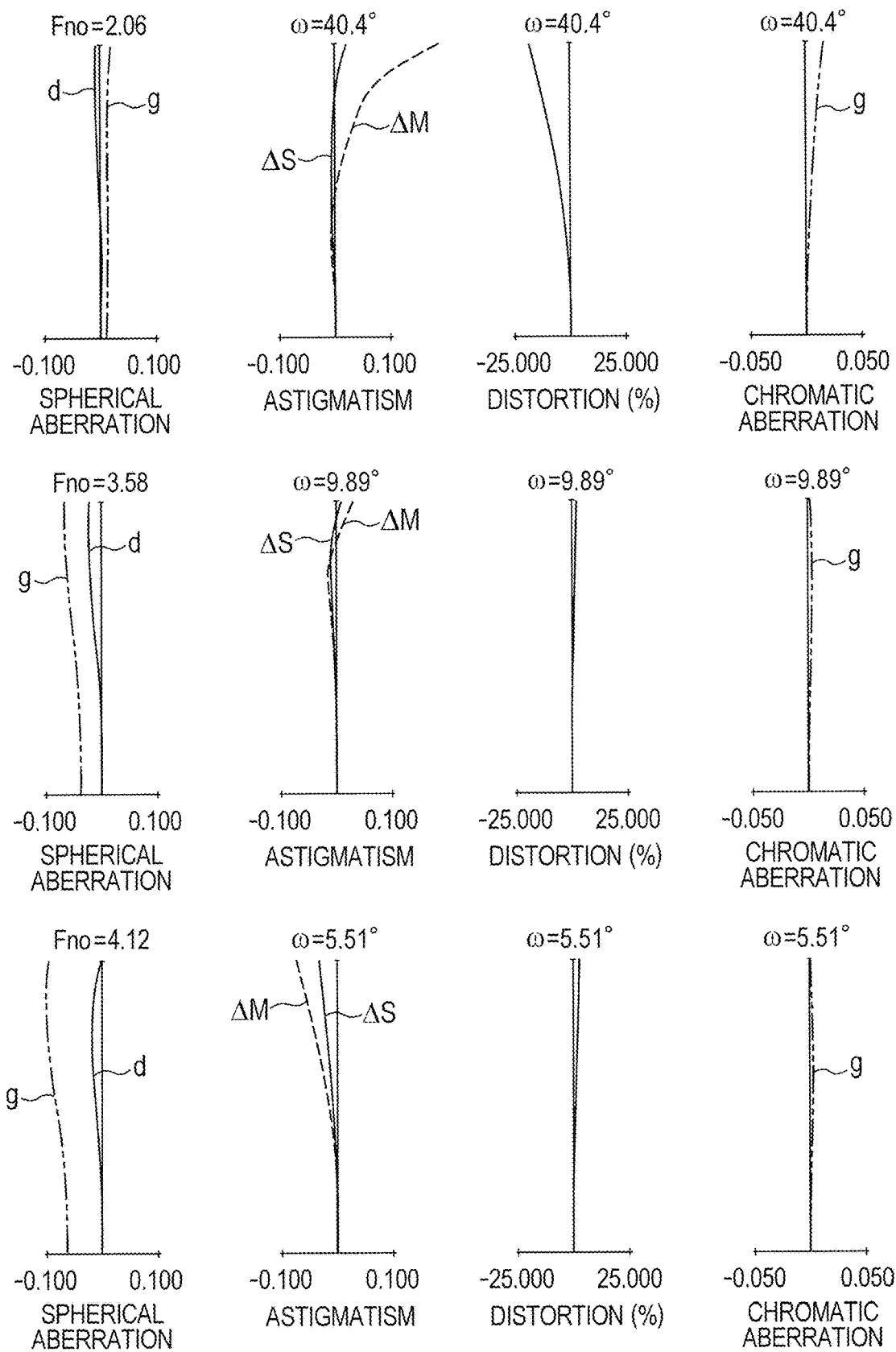
FIG. 4 is aberration diagrams of the optical system of Example 2 at the wide angle end, at an intermediate zoom position, and at a telephoto end when focusing at infinity.
Figure 5:
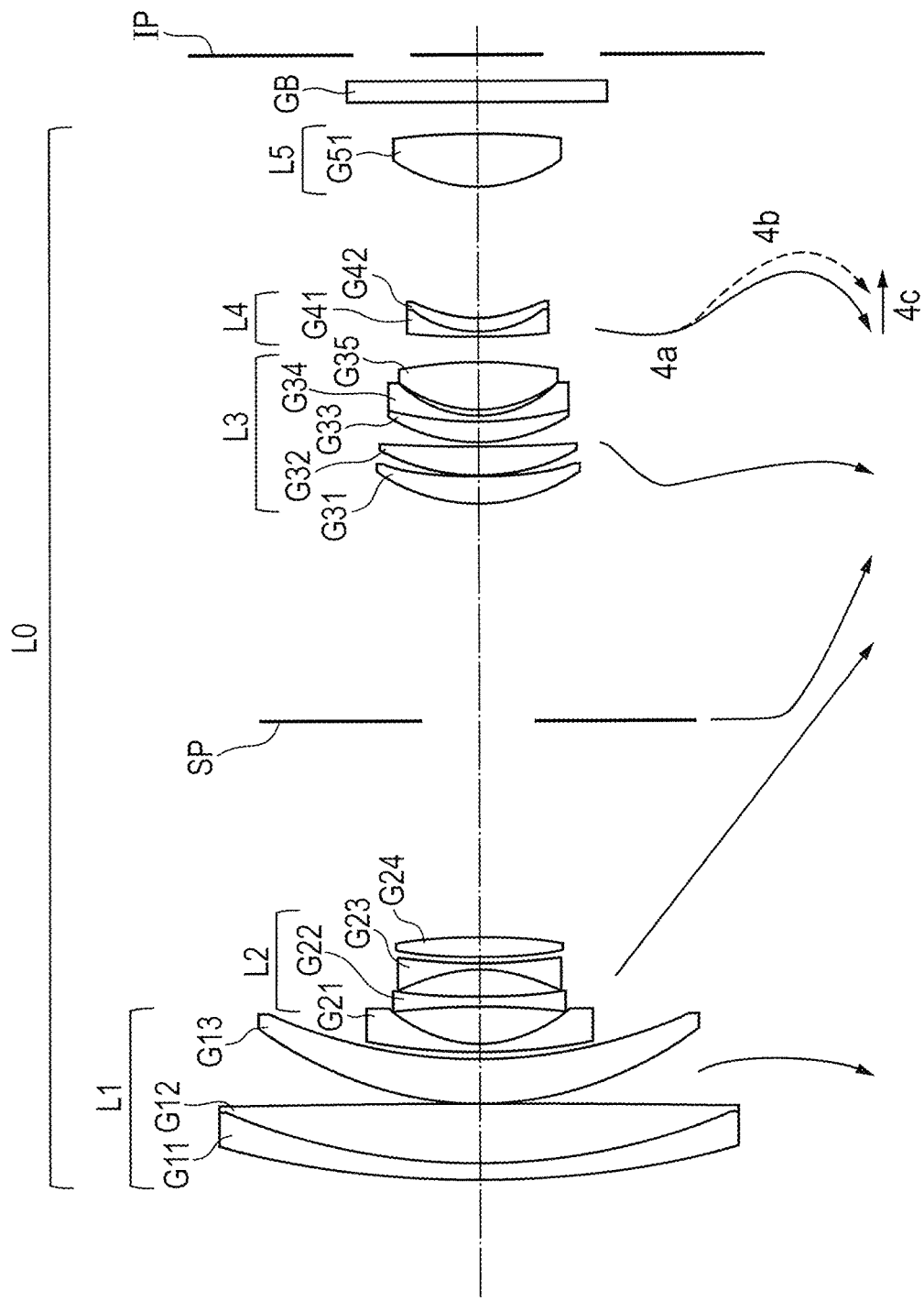
FIG. 5 is a lens cross-sectional view of an optical system of Example 3 of the present invention at a wide angle end when focusing at infinity.
Figure 6:
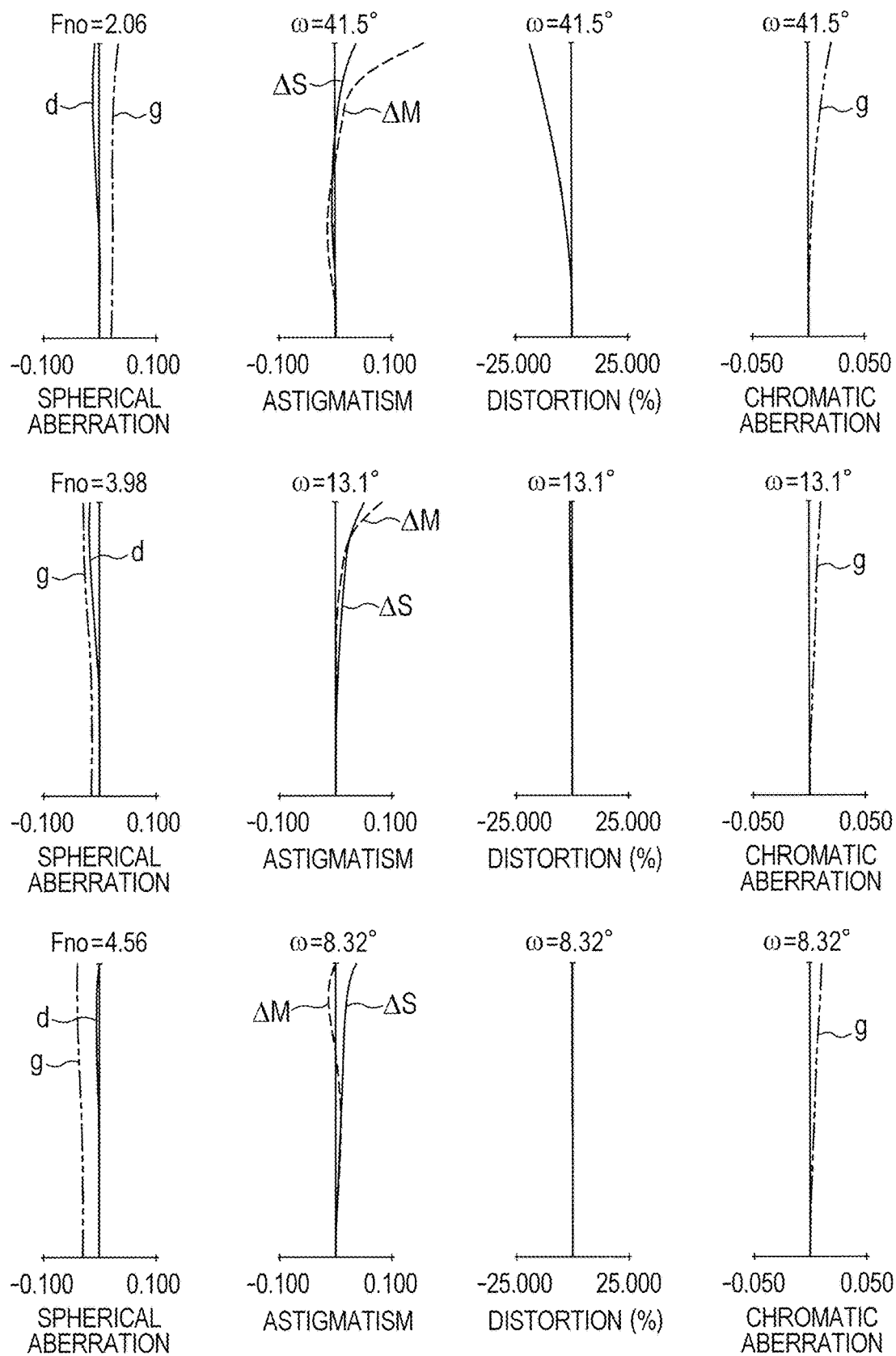
FIG. 6 is aberration diagrams of the optical system of Example 3 at the wide angle end, at an intermediate zoom position, and at a telephoto end when focusing at infinity.
Figure 7A:
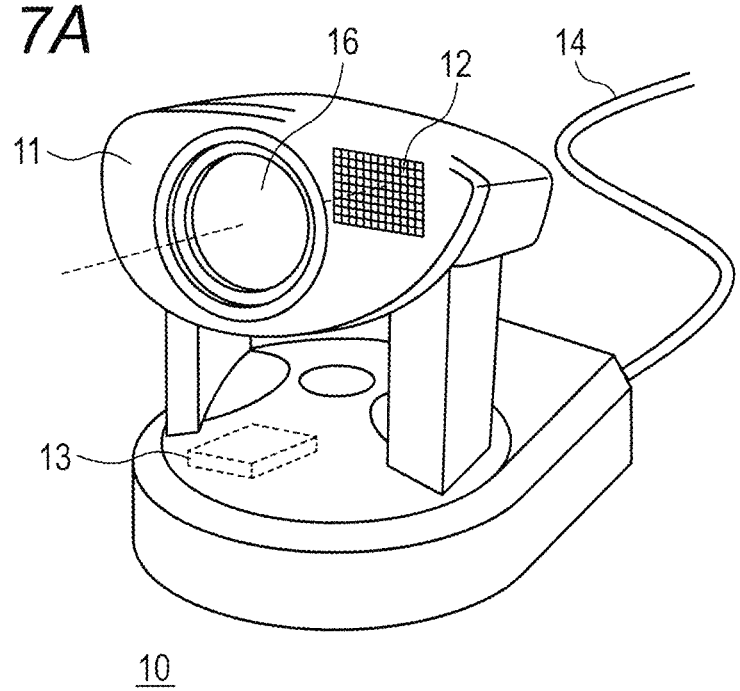
FIG. 7A and FIG. 7B are each a schematic view of a main part of an image pickup apparatus according to an embodiment of the present invention.
Figure 7B:
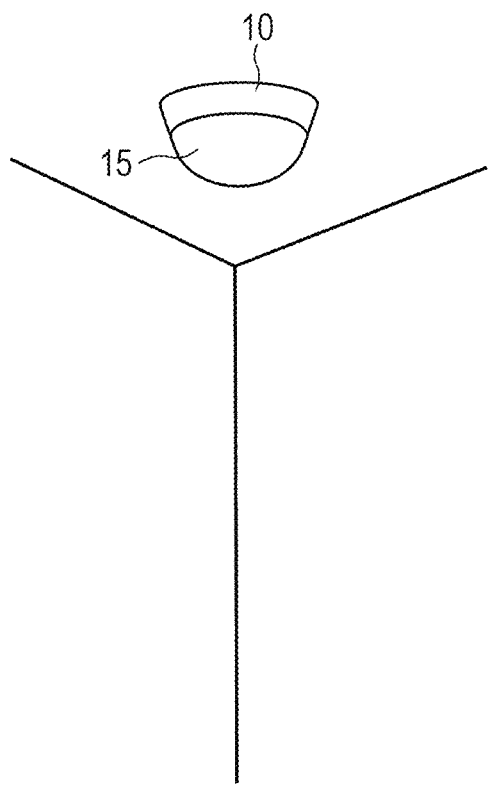

FIG. 3 is a lens cross-sectional view of a zoom lens of Example 2 of the present invention at a wide angle end when focusing on an object at infinity. FIG. 4 is longitudinal aberration diagrams of the zoom lens of Example 2 at the wide angle end, at an intermediate zoom position, and at a telephoto end in order from the top when focusing on an object at infinity. FIG. 5 is a lens cross-sectional view of a zoom lens of Example 3 of the present invention at a wide angle end when focusing on an object at infinity. FIG. 6 is longitudinal aberration diagrams of the zoom lens of Example 3 at the wide angle end, at an intermediate zoom position, and at a telephoto end in order from the top when focusing on an object at infinity. FIG. 7A and FIG. 7B are each a schematic view of a main part of the image pickup apparatus according to an embodiment of the present invention.

The optical system according to this embodiment is applicable to a zoom lens to be used in image pickup apparatus such as a digital camera, a video camera, a broadcasting camera, a monitoring camera, and a silver-halide film camera. The optical system according to this embodiment may also be used as a projection optical system for a projection apparatus (projector). In the lens cross-sectional views, the left side is the object side (front), and the right side is the image side (rear). Further, a zoom lens L0 is illustrated in the lens cross-sectional views. When the order of a lens unit from the object side is represented by "i", the i-th lens unit is represented by Li.

The optical system includes a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. The optical system also includes an aperture stop SP. The optical system further includes an optical block GB, which corresponds to an optical filter, a face plate, a low pass filter, an infrared cut filter, or the like.

Provided is an image plane IP, which corresponds to an image pickup surface of a solid-state image pickup element (photo-electric conversion element) such as a CCD sensor or a CMOS sensor when the zoom lens is used as an image pickup apparatus of a digital camera, a video camera, or the like. When the zoom lens is used as an image pickup apparatus of a silver-halide film camera, the image plane IP corresponds to a film surface. The movement locus of each lens unit during zooming from the wide angle end to the telephoto end is indicated by the arrow.

In the zoom lens of each Example, an interval between each pair of adjacent lens units is changed during zooming. The wide angle end and the telephoto end refer to zoom positions at the time of a magnification varying lens unit being located at both ends of a range in which the magnification varying lens unit is mechanically movable on the optical axis.

In each Example, the fourth lens unit L4 is configured to move to correct an image plane variation accompanying magnification and to perform focusing. A solid curve 4a and a dotted curve 4b concerning the fourth lens unit L4 are movement loci for correcting the image plane variation accompanying magnification at the time of focusing on an object at infinity and a close distance object, respectively. Further, during focusing from the object at infinity to the close distance object, the fourth lens unit L4 is moved toward the image side as indicated by an arrow 4c. Focusing may be performed not only with the fourth lens unit L4 but also with one or a plurality of other lens units.

In the aberration diagrams, a reference symbol Fno represents an F-number. A reference symbol "ω" represents a half angle of view (degrees). In the spherical aberration diagrams, a solid line "d" represents a d-line (wavelength: 587.6 nm), and a two-dot chain line "g" represents a g-line (wavelength: 435.8 nm). In the astigmatism diagrams, a dotted line ΔM indicates a meridional image plane with respect to the d-line, and a solid line ΔS indicates a sagittal image plane with respect to the d-line. The distortion diagrams are represented for the d-line. In the lateral chromatic aberration diagrams, a two-dot chain line "g" indicates the g-line. When Numerical Data described later is represented by units of millimeters, in the longitudinal aberration diagrams, the scales used are: 0.2 mm for the spherical aberration, 0.2 mm for astigmatism, 25% for distortion, and 0.05 mm for the lateral chromatic aberration.

Now, the lens configuration of each Example and an image pickup apparatus including the same are described. The lens units are arranged in order from the object side to the image side.

Example 1

The first lens unit L1 consists of a meniscus negative lens G11, a biconvex positive lens G12, and a meniscus positive lens G13. The negative lens G11 and the positive lens G12 form a cemented lens obtained by cementing those lenses, and form on the cemented surface a diffraction surface as one of optical elements. With this, the axial chromatic aberration is satisfactorily corrected at the telephoto end. Further, a glass material of the negative lens G11 is S-NBH56 (product name) (manufactured by OHARA INC.), and its thickness is set appropriately. With this, the moldability of the diffraction surface of the cemented surface is kept to enhance the resistance to environment.

The second lens unit L2 consists of a meniscus negative lens G21, a biconcave negative lens G22, a biconcave negative lens G23, and a biconvex positive lens G24. In order to contribute to achieving a higher zoom ratio, a plurality of negative lenses having strong powers (refractive powers) are used. Further, both surfaces of the negative lens G22 have aspherical shapes, thereby satisfactorily correcting field curvature and an astigmatism at the wide angle end.

The third lens unit L3 consists of a meniscus positive lens G31, a biconvex positive lens G32, a meniscus positive lens G33, a meniscus negative lens G34, and a biconvex positive lens G35. The positive lens G33 and the negative lens G34 form a cemented lens obtained by cementing those lenses. Through increase of a difference in Abbe number of the materials of both lenses, the chromatic aberration is satisfactorily corrected. Further, both surfaces of each of the positive lens G31 and the positive lens G35 have aspherical shapes, thereby satisfactorily correcting the spherical aberration, coma, and the like in the entire zoom region.

The fourth lens unit L4 consists of a meniscus negative lens G41 and a meniscus positive lens G42. The negative lens G41 and the positive lens G42 form a cemented lens obtained by cementing those lenses. Through increase of a difference in Abbe number of the materials of both lenses, the chromatic aberration is satisfactorily corrected. The fifth lens unit L5 consists of a biconvex positive lens G51. The aperture stop SP is arranged between the second lens unit L2 and the third lens unit L3, and is configured to move during zooming.

Example 2

The first lens unit L1 consists of a meniscus negative lens G11, a biconvex positive lens G12, and a meniscus positive lens G13. The negative lens G11 and the positive lens G12 form a cemented lens obtained by cementing those lenses, and form a diffraction surface on the cemented surface. Further, a glass material of the negative lens G11 is TAFD40 (product name), and its thickness is set appropriately. The second lens unit L2 consists of a meniscus negative lens G21, a biconcave negative lens G22, a biconcave negative lens G23, and a biconvex positive lens G24. Both surfaces of the negative lens G22 have aspherical shapes.

The third lens unit L3 consists of a meniscus positive lens G31, a meniscus positive lens G32, a meniscus positive lens G33, a meniscus negative lens G34, and a biconvex positive lens G35. The positive lens G33 and the negative lens G34 form a cemented lens obtained by cementing those lenses. Both surfaces of each of the positive lens G31 and the positive lens G35 have aspherical shapes.

The fourth lens unit L4 consists of a meniscus negative lens G41 and a meniscus positive lens G42. The negative lens G41 and the positive lens G42 form a cemented lens obtained by cementing those lenses. The fifth lens unit L5 consists of a biconvex positive lens G51. The aperture stop SP is arranged between the second lens unit L2 and the third lens unit L3, and is configured to move during zooming.

Example 3

The first lens unit L1 consists of a meniscus negative lens G11, a biconvex positive lens G12, and a meniscus positive lens G13. The negative lens G11 and the positive lens G12 form a cemented lens obtained by cementing those lenses, and form a diffraction surface on the cemented surface. Further, a glass material of the negative lens G11 is S-TIH6 (product name) (manufactured by OHARA INC.), and its thickness is set appropriately. The second lens unit L2 consists of a meniscus negative lens G21, a biconcave negative lens G22, a biconcave negative lens G23, and a biconvex positive lens G24. Both surfaces of the negative lens G22 have aspherical shapes.

The third lens unit L3 consists of a meniscus positive lens G31, a meniscus positive lens G32, a meniscus positive lens G33, a concave meniscus negative lens G34, and a biconvex positive lens G35. The positive lens G33 and the negative lens G34 form a cemented lens obtained by cementing those lenses. Both surfaces of each of the positive lens G31 and the positive lens G35 have aspherical shapes.

The fourth lens unit L4 consists of a meniscus negative lens G41 and a meniscus positive lens G42. The negative lens G41 and the positive lens G42 form a cemented lens obtained by cementing those lenses. The fifth lens unit L5 consists of a biconvex positive lens G51. The aperture stop SP is arranged between the second lens unit L2 and the third lens unit L3, and is configured to move during zooming.

Next, an image pickup apparatus using the optical system of this embodiment according to the embodiment of the present invention is described with reference to FIG. 7A and FIG. 7B. In FIG. 7A, a camera body 11 has a built-in solid-state image pickup element (photo-electric conversion element) 12 configured to receive light of an object image formed by an optical system 16. The solid-state image pickup element 12 is, for example, a CCD sensor or a CMOS sensor. A memory portion 13 records information corresponding to the object image that has been photoelectrically converted by the solid-state image pickup element 12. A network cable 14 transfers the object image that has been photoelectrically converted by the solid-state image pickup element 12.

Further, FIG. 7B is a view for illustrating an example in which an image pickup apparatus 10 covered with a dome cover 15 is mounted on a ceiling for use. The image pickup apparatus is not limited to a monitoring camera, and may be a video camera, a digital camera, or the like.

As described above, according to each Example, it is possible to obtain an optical system having both moldability and resistance to environment and having high optical performance, and to obtain an image pickup apparatus including the optical system.

In each Example, the following configurations may be adopted.

Changing each lens shape and the number of lenses as appropriate without limiting to those described in each Example Changing the optical element as appropriate, without limiting to the diffraction surface, to an optical element using a UV curing resin, such as a replica aspherical surface made of a resin material, or a solid material made of a resin material with minute particles dispersed therein and having an abnormal portion dispersing characteristic Correcting an image blur accompanying a vibration such as camera shake by moving some of the lenses and the lens units so as to have a component in a direction perpendicular to the optical axis Correcting the distortion and the chromatic aberration by an electric corrector Here, an image pickup system (a monitoring camera system) including the zoom lens of any one of the examples and a control unit to control the zoom lens may be constructed. In this case, the control unit may control the zoom lens so that each of the lens units is moved during zooming as described above. In this case, the control unit does not always have to be integrated with the zoom lens. Hence, the control unit may be provided separately from the zoom lens. For example, a control unit (a control apparatus) may be located remote from a drive unit to drive the respective lenses in the zoom lens, and configured to include a transmitter to transmit a control signal (a command) for controlling the zoom lens. The above-mentioned control unit can remote-control the zoom lens.

Meanwhile, a configuration to control the zoom lens in response to an input from a user to an operation unit may be adopted by providing the control unit with the operation unit such as a controller and buttons for remote-controlling the zoom lens. For example, a zoom-in button and a zoom-out button are provided as the operation unit so as to transmit the signals from the control unit to the drive unit for the zoom lens in such a way that the magnification of the zoom lens is increased when a user presses the zoom-in button and the magnification of the zoom lens is decreased when the user presses the zoom-out button.

In the meantime, the image pickup system may include a display unit such as a liquid crystal panel to display information related to zooming of the zoom lens (a state of movement). Examples of the information related to zooming of the zoom lens include a zoom magnification (a zoom state) and an amount of movement (a state of movement) of each lens unit. In this case, the user can remote-control the zoom lens through the operation unit while watching the information related to zooming of the zoom lens displayed on the display unit. In this case, the display unit and the operation unit may be integrated together by adopting a touch panel, for example.

Specific Numerical Data corresponding to the zoom lens of Examples 1 to 3 are described below. In each Numerical Data, "i" indicates the order from the object side, "ri" indicates the curvature radius of an i-th optical surface (i-th surface), "di" indicates an on-axis interval between the i-th surface and an (i+1)-th surface, and "ndi" and "vdi" indicate the refractive index and Abbe number of a material of an optical member between the i-th surface and the (i+1)-th surface with respect to the d-line, respectively. An aspherical shape is expressed by the following expression.

$$X = \frac{H^2/R}{1 + \sqrt{1 - (1+K)(H/R)^2}} + A4H^4 + A6H^6 + A8H^8 + A10H^{10}$$

In this expression, the X-axis represents an optical axis direction, the H-axis represents an axis in a direction perpendicular to the optical axis, a traveling direction of light is positive, R represents a paraxial curvature radius, K represents a conic constant, and A4, A6, A8, and A10 represent aspherical coefficients.

The asterisk (*) indicates a surface having an aspherical shape. The notation "e-x" indicates $10^{-x}$. The notation "BF" indicates an air-converted back focus. The total lens length is a value obtained by adding the back focus BF to a distance from the first lens surface to the last lens surface. Values of the focal length, the F-number, the half angle of view are those obtained when focus is on an object at infinity. Moreover, a relationship between Conditional Expressions described above and Numerical Data is shown in Table 1.

Numerical Data 1

| Unit: mm | | | | |
|---|---|---|---|---|
| Surface data | | | | |
| Surface number | r | d | nd | vd |
| 1 | 162.733 | 1.50 | 1.85478 | 24.8 |
| 2 (Diffraction) | 42.441 | 4.82 | 1.77250 | 49.6 |
| 3 | −176.784 | 0.15 | | |
| 4 | 31.030 | 2.73 | 1.80400 | 46.6 |
| 5 | 62.130 | (Variable) | | |
| 6 | 53.030 | 0.65 | 1.88300 | 40.8 |
| 7 | 10.663 | 3.04 | | |
| 8* | −39.841 | 0.80 | 1.77250 | 49.6 |
| 9* | 131.643 | 1.99 | | |
| 10 | −12.769 | 0.50 | 1.69680 | 55.5 |
| 11 | 58.578 | 0.49 | | |
| 12 | 44.559 | 1.55 | 1.95906 | 17.5 |
| 13 | −47.716 | (Variable) | | |
| 14 (Stop) | ∞ | (Variable) | | |
| 15* | 14.492 | 2.23 | 1.88202 | 37.2 |
| 16* | 35.170 | 0.17 | | |
| 17 | 17.497 | 2.32 | 1.48749 | 70.2 |
| 18 | 176.882 | 0.31 | | |
| 19 | 14.780 | 1.66 | 1.49700 | 81.5 |
| 20 | 30.162 | 0.50 | 2.00069 | 25.5 |
| 21 | 9.317 | 0.50 | | |
| 22* | 10.296 | 3.87 | 1.49700 | 81.5 |
| 23* | −24.797 | (Variable) | | |
| 24 | 69.016 | 0.45 | 1.88300 | 40.8 |
| 25 | 9.819 | 1.05 | 1.89286 | 20.4 |
| 26 | 12.189 | (Variable) | | |

-continued

Unit: mm

| | | | | |
|---|---|---|---|---|
| 27 | 12.093 | 4.28 | 1.49700 | 81.5 |
| 28 | −67.237 | 2.48 | | |
| 29 | ∞ | 1.72 | 1.51500 | 70.0 |
| 30 | ∞ | 2.08 | | |
| Image plane | ∞ | | | |

Aspherical surface data

Second surface (diffraction surface)

| | | |
|---|---|---|
| A2 = −1.63156e−004 | A4 = 7.33797e−008 | A6 = −1.13068e−010 |
| A8 = −9.63136e−014 | A10 = 9.97824e−016 | |

Eighth surface

| | | |
|---|---|---|
| K = −4.47637e+000 | A5 = 1.46851e−005 | A7 = 7.39012e−008 |
| A9 = −4.58297e−009 | | |

Ninth surface

| | | |
|---|---|---|
| K = −1.97936e+000 | A4 = 5.13211e−005 | A6 = 5.02218e−006 |
| A8 = −6.95625e−008 | | |

Fifteenth surface

| | |
|---|---|
| K = −2.55124e−002 | A4 = 3.49920e−006 |

Sixteenth surface

| | |
|---|---|
| K = −1.93738e+000 | A4 = 4.32679e−005 |

Twenty-second surface

| | | |
|---|---|---|
| K = 8.18784e−001 | A4 = −1.39872e−004 | A6 = −4.46451e−007 |
| A8 = −3.37644e−008 | | |

Twenty-third surface

| | | |
|---|---|---|
| K = −3.48068e+001 | A4 = −1.83963e−004 | A6 = 8.18669e−006 |
| A8 = −1.80381e−007 | A10 = 2.33486e−009 | |

Various data
Zoom ratio 19.09

| | Wide angle | Intermediate | Telephoto |
|---|---|---|---|
| Focal length | 6.40 | 47.97 | 122.14 |
| F-number | 2.06 | 3.58 | 4.12 |
| Half angle of view (degrees) | 36.16 | 6.54 | 2.58 |
| Image height | 4.67 | 5.50 | 5.50 |
| Total lens length | 89.41 | 88.51 | 89.41 |
| BF | 5.69 | 5.69 | 5.69 |
| d5 | 0.60 | 25.24 | 31.94 |
| d13 | 17.47 | 0.85 | 0.80 |
| d14 | 17.63 | 6.84 | 0.60 |
| d23 | 2.00 | 10.98 | 2.00 |
| d26 | 10.47 | 3.36 | 12.83 |

Zoom lens unit data

| Unit | First surface | Focal length |
|---|---|---|
| 1 | 1 | 46.77 |
| 2 | 6 | −8.10 |
| 3 | 15 | 14.44 |
| 4 | 24 | −17.04 |
| 5 | 27 | 21.00 |

Numerical Data 2

Unit: mm

Surface data

| Surface number | r | d | nd | vd |
|---|---|---|---|---|
| 1 | 89.215 | 0.82 | 2.00069 | 25.5 |
| 2 (Diffraction) | 38.254 | 2.63 | 1.77250 | 49.6 |
| 3 | −116.428 | 0.08 | | |
| 4 | 17.426 | 1.49 | 1.80400 | 46.6 |
| 5 | 30.889 | (Variable) | | |
| 6 | 28.926 | 0.35 | 1.88300 | 40.8 |
| 7 | 6.416 | 1.66 | | |
| 8* | −21.731 | 0.44 | 1.77250 | 49.6 |
| 9* | 71.805 | 1.09 | | |
| 10 | −6.965 | 0.27 | 1.69680 | 55.5 |
| 11 | 31.951 | 0.27 | | |
| 12 | 24.305 | 0.85 | 1.95906 | 17.5 |
| 13 | −26.027 | (Variable) | | |
| 14 (Stop) | ∞ | (Variable) | | |
| 15* | 7.905 | 1.22 | 1.88202 | 37.2 |
| 16* | 19.184 | 0.09 | | |
| 17 | 9.544 | 1.27 | 1.48749 | 70.2 |
| 18 | 96.481 | 0.17 | | |
| 19 | 8.062 | 0.91 | 1.49700 | 81.5 |
| 20 | 16.452 | 0.27 | 2.00069 | 25.5 |
| 21 | 5.082 | 0.27 | | |
| 22* | 5.616 | 2.11 | 1.49700 | 81.5 |
| 23* | −13.526 | (Variable) | | |
| 24 | 37.645 | 0.25 | 1.88300 | 40.8 |
| 25 | 5.356 | 0.57 | 1.89286 | 20.4 |
| 26 | 6.648 | (Variable) | | |
| 27 | 6.596 | 2.33 | 1.49700 | 81.5 |
| 28 | −36.675 | 1.35 | | |
| 29 | ∞ | 0.94 | 1.51500 | 70.0 |
| 30 | ∞ | 1.13 | | |
| Image plane | ∞ | | | |

Aspherical surface data

Second surface (diffraction surface)

| | | |
|---|---|---|
| A2 = −8.63156e−004 | A4 = 7.33797e−008 | A6 = −1.13068e−010 |
| A8 = −9.63136e−014 | A10 = 9.97824e−016 | |

Eighth surface

| | | |
|---|---|---|
| K = −4.47637e+000 | A5 = 1.65899e−004 | A7 = 2.80608e−006 |
| A9 = −5.84896e−007 | | |

Ninth surface

| | | |
|---|---|---|
| K = −1.97936e+000 | A4 = 3.16243e−004 | A6 = 1.04016e−004 |
| A8 = −4.84245e−006 | | |

Fifteenth surface

| | |
|---|---|
| K = −2.55124e−002 | A4 = 2.15622e−005 |

Sixteenth surface

| | |
|---|---|
| K = −1.93738e+000 | A4 = 2.66619e−004 |

Twenty-second surface

| | | |
|---|---|---|
| K = 8.18784e−001 | A4 = −8.61894e−004 | A6 = −9.24657e−006 |
| A8 = −2.35044e−006 | | |

Twenty-third surface

| | | |
|---|---|---|
| K = −3.48068e+001 | A4 = −1.13359e−003 | A6 = 1.69557e−004 |
| A8 = −1.25569e−005 | A10 = 5.46304e−007 | |

Various data
Zoom ratio 7.66

| | Wide angle | Intermediate | Telephoto |
|---|---|---|---|
| Focal length | 3.65 | 16.16 | 27.91 |
| F-number | 2.06 | 3.58 | 4.12 |
| Half angle of view (degrees) | 34.97 | 10.52 | 6.14 |
| Image height | 2.55 | 3.00 | 3.00 |
| Total lens length | 48.67 | 48.18 | 48.67 |
| BF | 3.01 | 3.01 | 3.01 |
| d5 | 0.33 | 12.14 | 15.42 |
| d13 | 9.53 | 2.09 | 2.43 |

-continued

Unit: mm

| d14 | 9.61 | 3.73 | 0.32 |
|---|---|---|---|
| d23 | 1.09 | 5.79 | 7.88 |
| d26 | 5.71 | 2.04 | 0.21 |

Zoom lens unit data

| Unit | First surface | Focal length |
|---|---|---|
| 1 | 1 | 28.91 |
| 2 | 6 | −4.76 |
| 3 | 15 | 7.88 |
| 4 | 24 | −9.30 |
| 5 | 27 | 11.45 |

Numerical Data 3

Unit: mm

Surface data

| Surface number | r | d | nd | νd |
|---|---|---|---|---|
| 1 | 63.255 | 1.01 | 1.80518 | 25.4 |
| 2 (Diffraction) | 40.214 | 3.51 | 1.77250 | 49.6 |
| 3 | −658.246 | 0.11 | | |
| 4 | 22.567 | 2.49 | 1.80400 | 46.6 |
| 5 | 30.555 | (Variable) | | |
| 6 | 38.568 | 0.47 | 1.88300 | 40.8 |
| 7 | 7.755 | 2.21 | | |
| 8* | −28.975 | 0.58 | 1.77250 | 49.6 |
| 9* | 95.740 | 1.45 | | |
| 10 | −9.286 | 0.36 | 1.69680 | 55.5 |
| 11 | 42.602 | 0.36 | | |
| 12 | 32.406 | 1.13 | 1.95906 | 17.5 |
| 13 | −34.703 | (Variable) | | |
| 14 (Stop) | ∞ | (Variable) | | |
| 15* | 10.540 | 1.62 | 1.88202 | 37.2 |
| 16* | 25.578 | 0.13 | | |
| 17 | 12.725 | 1.69 | 1.48749 | 70.2 |
| 18 | 128.642 | 0.22 | | |
| 19 | 10.749 | 1.21 | 1.49700 | 81.5 |
| 20 | 21.936 | 0.36 | 2.00069 | 25.5 |
| 21 | 6.776 | 0.36 | | |
| 22* | 7.488 | 2.81 | 1.49700 | 81.5 |
| 23* | −18.034 | (Variable) | | |
| 24 | 50.193 | 0.33 | 1.88300 | 40.8 |
| 25 | 7.141 | 0.76 | 1.89286 | 20.4 |
| 26 | 8.864 | (Variable) | | |
| 27 | 8.795 | 3.11 | 1.49700 | 81.5 |
| 28 | −48.900 | 1.81 | | |
| 29 | ∞ | 1.25 | 1.51500 | 70.0 |
| 30 | ∞ | 1.51 | | |
| Image plane | ∞ | | | |

Aspherical surface data

Second surface (diffraction surface)

$A2 = -7.23156e-004$  $A4 = 7.33797e-008$  $A6 = -1.13068e-010$
$A8 = -9.63136e-014$  $A10 = 9.97824e-016$

Eighth surface $K = -4.47637e+000$  $A5 = 5.24914e-005$  $A7 = 4.99422e-007$
$A9 = -5.85557e-008$ Ninth surface $K = -1.97936e+000$  $A4 = 1.33415e-004$  $A6 = 2.46834e-005$
$A8 = -6.46389e-007$ Fifteenth surface $K = -2.55124e-002$  $A4 = 9.09656e-006$ -continued Unit: mm Sixteenth surface $K = -1.93738e+000$  $A4 = 1.12480e-004$ Twenty-second surface $K = 8.18784e-001$  $A4 = -3.63612e-004$  $A6 = -2.19425e-006$
$A8 = -3.13746e-007$ Twenty-third surface $K = -3.48068e+001$  $A4 = -4.78232e-004$  $A6 = 4.02367e-005$
$A8 = -1.67614e-006$  $A10 = 4.10190e-008$ Various data
Zoom ratio 5.81

| | Wide angle | Intermediate | Telephoto |
|---|---|---|---|
| Focal length | 4.71 | 17.34 | 27.41 |
| F-number | 2.06 | 3.98 | 4.56 |
| Half angle of view (degrees) | 35.80 | 12.99 | 8.30 |
| Image height | 3.40 | 4.00 | 4.00 |
| Total lens length | 65.50 | 64.85 | 65.51 |
| BF | 4.20 | 4.20 | 4.20 |
| d5 | 0.43 | 14.28 | 18.23 |
| d13 | 12.70 | 4.69 | 5.58 |
| d14 | 12.82 | 4.97 | 0.43 |
| d23 | 1.45 | 6.92 | 9.96 |
| d26 | 7.61 | 3.50 | 0.82 |

Zoom lens unit data

| Unit | First surface | Focal length |
|---|---|---|
| 1 | 1 | 39.60 |
| 2 | 6 | −5.89 |
| 3 | 15 | 10.51 |
| 4 | 24 | −12.40 |
| 5 | 27 | 15.27 |

A relationship between Conditional Expressions described above and each Example is shown.

TABLE 1

| | Example 1 | Example 2 | Example 3 |
|---|---|---|---|
| τi | 0.92 | 0.72 | 0.81 |
| t | 1.50 | 0.82 | 1.01 |
| T | 4.30 | 1.52 | 2.09 |
| τdet | 0.00 | 0.00 | 0.00 |
| d | 1.50 | 0.82 | 1.01 |
| r2 | 42.441 | 38.254 | 40.214 |
| r1 | 162.733 | 89.215 | 63.255 |
| θgF | 0.6122 | 0.6135 | 0.6161 |
| νd | 24.8 | 25.5 | 25.4 |
| Conditional Expression (1) | 0.88 | 0.76 | 0.81 |
| Conditional Expression (2) | 0.70 | 0.61 | 0.64 |
| Conditional Expression (3) | 0.00 | 0.00 | 0.00 |
| Conditional Expression (4) | 0.35 | 0.54 | 0.48 |
| Conditional Expression (5) | −1.71 | −2.50 | −4.49 |
| Conditional Expression (6) | 0.0101 | 0.0126 | 0.0150 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-081258, filed Apr. 17, 2017, which is hereby incorporated by reference herein in its entirety.

What is claimed is:

1. An optical system, comprising:
a cemented lens including a positive lens, a negative lens, and an optical element cemented to the positive lens and the negative lens,
wherein the optical element is made of an ultraviolet (UV) curing resin, and
wherein the following conditional expressions are satisfied:

$$0.60 < |\tau i^{(t/10)}| < 0.95; \text{ and}$$

$$0.50 < |\tau i^{(T/10)}| < 0.95,$$

where $\lambda i$ represents a wavelength of an ultraviolet (UV) ray at which the UV curing resin is cured, $\tau i$ represents an internal transmittance at the wavelength $\lambda i$ per thickness of 10 mm of a material for a first lens, which is arranged on an object side out of the positive lens and the negative lens, and t and T represent a minimum value and a maximum value of a thickness of the first lens in an optical axis direction, respectively.

2. An optical system according to claim 1, wherein the following conditional expression is satisfied:

$$0.00 \leq |\tau det^{(t/10)}| < 0.15,$$

where $\lambda det$ represents a wavelength of a UV ray at which the UV curing resin is deteriorated, and $\tau det$ represents an internal transmittance at the wavelength $\lambda det$ per thickness of 10 mm of the material for the first lens.

3. An optical system according to claim 1, wherein the following conditional expression is satisfied:

$$0.10 < d/T < 1.00,$$

where d represents a thickness of the first lens in the optical axis direction.

4. An optical system according to claim 1, wherein the following conditional expression is satisfied:

$$-7.00 < (r2+r1)/(r2-r1) < -0.50,$$

where r1 represents a curvature radius of an object-side lens surface of the first lens, and r2 represents a curvature radius of an image-side lens surface of the first lens.

5. An optical system according to claim 1, wherein the first lens is arranged closest to an object among lenses included in the optical system.

6. An optical system according to claim 1, wherein the following conditional expression is satisfied:

$$0.001 < |\theta gF - 0.6438 + 0.001682 \times vd| < 0.020,$$

where $\theta gF$ and $vd$ represent a partial dispersion ratio and an Abbe number of the material for the first lens, respectively.

7. An optical system according to claim 1, further comprising a plurality of lens units,
wherein an interval between each pair of adjacent lens units among the plurality of lens units is changed during zooming.

8. An optical system according to claim 7, wherein the cemented lens is included in a lens unit arranged closest to an object among the plurality of lens units.

9. An optical system according to claim 7, further comprising, in order from the object side to an image side:
a first lens unit having a positive refractive power;
a second lens unit having a negative refractive power;
an aperture stop;
a third lens unit having a positive refractive power;
a fourth lens unit having a negative refractive power; and
a fifth lens unit having a positive refractive power.

10. An optical system according to claim 1, wherein the optical element includes a diffractive optical element.

11. An image pickup apparatus, comprising:
the optical system of claim 1; and
an image pickup element configured to receive light of an image formed by the optical system.

12. An image pickup system, comprising:
the optical system of claim 7; and
a control unit configured to control the optical system during zooming.

13. An image pickup system according to claim 12,
wherein the control unit is formed as a separate member from the optical system, and
wherein the image pickup system further comprises a transmitter configured to transmit a control signal for controlling the optical system.

14. An image pickup system according to claim 12,
wherein the control unit is formed as a separate member from the optical system, and
wherein the image pickup system further comprises an operation unit for use in operation of the optical system.

15. An image pickup system according to claim 12, further comprising a display configured to display information related to zooming of the optical system.

* * * * *